July 28, 1959     G. B. ERSKINE     2,897,391
STUDDED ELECTRODE AND METHOD OF MANUFACTURE
Filed April 2, 1957
FIG. 1.
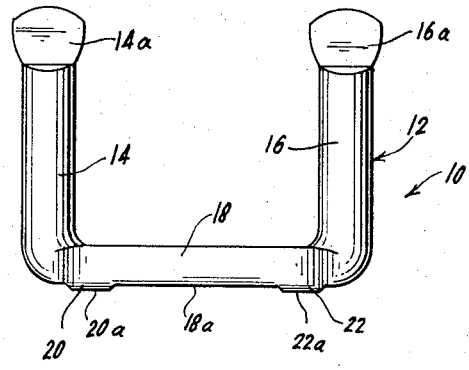
FIG. 2.
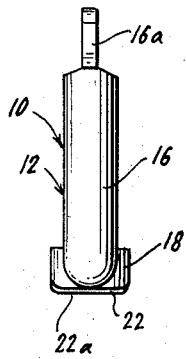
FIG. 3.
FIG. 4.
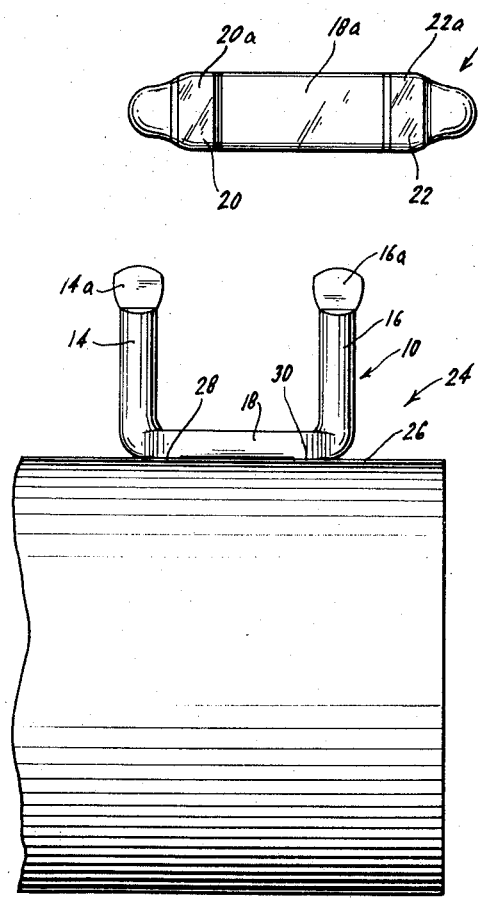
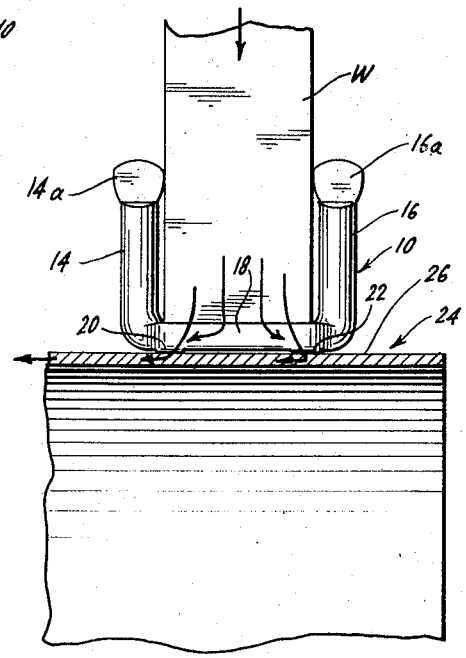
FIG. 5.
*INVENTOR.*
GEORGE ERSKINE
BY Amster & Levy
ATTORNEYS United States Patent Office 2,897,391
Patented July 28, 1959

2,897,391

STUDDED ELECTRODE AND METHOD OF MANUFACTURE

George B. Erskine, Emporium, Pa.

Application April 2, 1957, Serial No. 650,118

4 Claims. (Cl. 313—82)

The present invention relates to the manufacture of electrodes of the type including radially projecting studs, and in particular to studs and electrodes of improved construction and an improved method of manufacturing such studs and electrodes. This is a continuation-in-part of my earlier filed application, Serial No. 582,397 filed May 3, 1956 and entitled Improved Manufacture of Electrodes.

In the electron gun assembly of cathode ray tube devices, such as television picture tubes, there is found a number of electrodes which are maintained at various operating potentials in order to focus and accelerate the electron beam. These electrodes usually take the form of a cup-like or sleeve-like body having a number of radially-extending mounting studs or pins on its outer periphery. Such electrodes are mounted as part of the electron gun assembly by imbedding terminal portions of the studs in thermoplastic supporting rods (i.e. glass) which serve to support the several electrodes in a prescribed axial array.

In accordance with the aforesaid copending application, electrodes are manufactured by forming a length of wire stock into the configuration of a U-shaped mounting stud, which stud is then welded to the electrode body by the application of welding pressure and current in the bight of the stud intermediate the projecting legs. The use of U-shaped mounting studs enables the assembly of the electron gun parts with the assurance of good structural strength, stability, and proper orientation between the several electrodes of the gun assembly. This represents a substantial improvement over the prior art methods and constructions wherein the mounting studs take the form of individual pins extending radially of the electrode body and welded thereto at one end.

As the use of U-shaped mounting stud as part of the electrode assembly becomes more prevalent, there exists a need to assure further simplification in handling; to enable the preparation of studded electrodes having high-strength welds at the joints between the studs and the electrode body; and to readily adapt to the manufacture of various types of U-shaped studs, including those having a comparatively wide separation between the respective legs.

One or more of the aforesaid objectives are achieved in accordance with the present invention through the provision of an improved stud for use in electrode assemblies, which stud comprises a U-shaped body including spaced legs connected by a bight, and spaced apart integral projections on the undersurface of the bight providing well defined regions for welding of the respective studs to electrode bodies. The integral projections on the bight of the U-shaped stud body provide concentrated areas of current flow during welding and makes it possible to accurately predict the nature, the quality and the location of the weld along the bight of the stud. The localized and concentrated area for the passage of welding current assures the more perfect utilization of welding current, enables the accurate location of one or more welds along the bight of the U-shaped stud, provides a more stable footing for the U-shaped stud against the electrode body, and facilitates the provision of high mechanical strength welds between the respective studs and the electrode bodies, even for studs having a comparatively wide leg separation.

In accordance with method aspects of the present invention electrodes are manufactured by forming a length of stock into a substantially U-shaped stud having legs interconnected by a bight with at least a pair of integral projections of the undersurface of the bight. The thus-formed U-shaped stud is assembled with a sleeve like electrode body with the integral projections abutting against the periphery of the body to define localized and accurately located areas for the passage of welding current and for the ultimate disposition of welds between the stud and the electrode body. Upon passage of the welding current through the projections, the localized current flow assures a more perfect utilization of the welding current. Further, it is possible to accurately predict the amount of current required to achieve a desired weld, without the risk of burning at the weld locations which represents a source of production shrinkage.

The above brief description, as well as further objects and advantages of the present invention will be best appreciated by reference to the following detailed description of a presently, preferred stud construction and improved electrode assembly, and the method of their manufacture, when taken in conjunction with the accompanying drawings, wherein:

Fig. 1 is an elevational view of an improved mounting stud embodying features of the present invention;

Fig. 2 is an end elevational view of the stud illustrated in Fig. 1, taken either from the left or from the right of Fig. 1;

Fig. 3 is a bottom plan view of the improved stud illustrated in Figs. 1 and 2;

Fig. 4 is an elevational view, with parts broken away and sectioned, showing the assembly of the improved stud with a sleeve-like electrode body and illustrating diagrammatically the general direction of current flow from the welding tool or electrode through the sleeve-like body of the electrode; and, Fig. 5 is an elevational view, with parts broken away showing a sleeve-like electrode body having a stud welded thereto in accordance with the present invention.

Referring now specifically to the drawings, there is shown in Figs. 1 to 3 an improved stud embodying features of the present invention, which has been generally designated by the reference numeral 10. The stud is formed of wire of circular cross section (as detailed at length in my copending application referred to hereinabove) and comprises a generally U-shaped body 12, including spaced legs 14, 16 connected by a bight 18. On the undersurface of the bight 18 are integral projections 20, 22 which provide uniform, well defined and discrete regions for welding of the stud 10 to an electrode body, as will be described in conjunction with Figs. 4 and 5 hereinafter. As seen best in Fig. 1, the spaced apart projections 20, 22 include bottom faces 20a, 22a disposed in a common plane slightly offset below the undersurface 18a of the bight whereby the surfaces 20a, 22a will serve as a footing for the improved stud 10 when the same is assembled with the electrode body. As seen best in Figs. 1 to 3, inclusive, the bight itself is somewhat flattened out to increase its cross section (when viewed from the top or the bottom) as compared to the generally circular cross section of the legs 14, 16. The formation of the general U-shaped configuration, the flattening of the bight 18, and the coining of the integral projections 20, 22 with the flat bottom faces 20a, 22a is accomplished by the proper construction of the tools and dies employed in the forming operations described in my copending application.

The projecting ends 14a, 16a of the legs 14, 16 are flattened out to provide tabs or ears which lie substantially in a common plane extending lengthwise of the stud 10. The ears or tabs 14a, 16a provide the requisite area contacts for mounting the studs on the thermoplastic supporting rods (i.e. glass) when the completed electrodes are mounted in a gun assembly in accordance with procedures well understood in the art. For details of a typical gun structure, reference may be made to the showing of my copending application or to many prior art patents, including United States Patent No. 2,275,029 of March 3, 1942, and 2,719,243 of September 27, 1955.

Reference will now be made to Fig. 4 which demonstrates a method for manufacturing a studded sleeve-like electrode for an electron gun assembly in accordance with the present invention wherein such electrode, generally designated by the reference numeral 24, includes a number of mounting studs 10 extending radially of a sleeve-like electrode body 26 at prescribed locations spaced circumferentially and along the length of the electrode body 26. The formed mounting stud 10 is brought into assembly with the electrode body 26, either automatically upon completion of the forming operation as described in my copending application, or by the use of separate tools, jigs and fixtures. In the illustrative arrangement, the welding electrode W, is engaged between the legs 14, 16 of the stud 10 and the lower-most face thereof is brought to bear against the flattened bight 18 whereupon the flat undersurfaces 20a, 22a of the integral projections 20, 22 are brought into contact with the underlying peripheral surfaces of the sleeve-like body 26. Upon application of welding current to the welding electrode W, and with the electrode body 26 forming part of the welding circuit as is conventional in bench and tweezer welding units, there will be a concentration of welding current flow in the discrete and well defined areas represented by the projections of the surfaces 20a, 22a and their contact with the underlying circumference of the sleeve-like body 26. It will be appreciated that the curvature of the electrode body 26 does not appreciably affect the degree of contact for the stud size and section is comparatively small in relation to the diameter of the sleeve, the showing of the drawings being exaggerated for the purposes of illustration. Upon passage of the welding current along the current flow paths indicated in Fig. 4 and through the respective regions 20, 22, welds will be formed between the stud 10 and the electrode body 26 of the electrode assembly 24, as indicated by the numerals 28, 30 in Fig. 5. Thus the stud 10 will be fixed to the electrode body 26 by spaced apart welds 28, 30, each of which is of a prescribed extent and formed as a result of a predicted and uniform current flow which may be established in practice by controlling the respective areas 20a, 22a and the amount of current applied to the welding electrode W. Although the method described in conjunction with Fig. 4 was in connection with a stud 10 having flattened ears or lugs 14a, 16a at the ends of the legs, it will be appreciated that such flats may be formed subsequent to the welding of the studs to the sleeve-like electrode bodies as in the method of my copending application.

By the above described method, it is possible to accurately pin-point the location of the welds which join each of the U-shaped studs to the sleeve-like electrode body; and to prepare a wide variety of studded electrodes, even when there is a comparatively wide separation between the legs of the studs. The discrete areas for current flow, and the more stable and well defined footing, assures greater uniformity and high yields in the mass production manufacture of studded electrodes.

A wide variety of substitution, change and modification is intended in the foregoing disclosure and in certain instances some features of the invention will be used without a corresponding use of other features. Accordingly, it is appropriate that the claims herein be construed broadly and in a manner consistent with the spirit and scope of the invention herein.

What I claim is:

1. As a new article of manufacture, an electrode including a sleeve-like body, and at least one U-shaped stud including legs connected by a bight, said stud being fabricated of wire stock of substantially circular cross-section and having the undersurface of said bight facing said body, said undersurface being formed with spaced apart projections contacting said body, and welds at said projections joining said stud to said body.

2. As a new article of manufacture, an electrode including a sleeve-like body, and at least one U-shaped stud including opposed legs connected by a bight, said stud being fabricated of wire stock of substantially circular cross-section and having its bight flattened, the undersurface of said flattened bight facing said body and being formed with spaced apart projections contacting said body, and welds at said projections joining said stud to said body.

3. In a gun assembly for a cathode ray tube of the type including at least one sleeve-like electrode adapted to be mounted on supporting rods of thermoplastic material, the improvement comprising a radially-extending U-shaped mounting stud having a bight joining opposed legs, said bight having spaced apart projections contacting said electrode and being welded to said electrode in regions substantially coextensive with the contact between said projections and said electrode, terminal portions of said legs being embedded in said supporting rods.

4. In a gun assembly for a cathode ray tube of the type including at least one sleeve-like electrode adapted to be mounted on supporting rods of thermoplastic material, the improvement comprising a radially-extending U-shaped mounting stud having a flattened bight joining opposed legs, said bight having two spaced apart integral projections extending transversely of said bight and contacting said electrode, and welds between said electrode and said stud in regions substantially coextensive with the contact between said projections and said electrode, terminal portions of said legs being embedded in said supporting rods.

References Cited in the file of this patent

UNITED STATES PATENTS

| | | |
|---|---|---|
| 1,314,816 | Lachman | Sept. 2, 1919 |
| 2,245,624 | Teal | June 17, 1941 |
| 2,348,216 | Holshouser | May 9, 1944 |
| 2,360,279 | Rollert | Oct. 10, 1944 |
| 2,476,060 | Moss | July 12, 1949 |
| 2,565,533 | Szegho et al. | Aug. 28, 1951 |
| 2,614,548 | Dutterer et al. | Oct. 21, 1952 |
| 2,701,320 | Kovach | Feb. 1, 1955 |
| 2,734,118 | Patten | Feb. 7, 1956 |
| 2,840,739 | Lesovicz | June 24, 1958 |

FOREIGN PATENTS

| | | |
|---|---|---|
| 613,145 | Great Britain | Nov. 23, 1948 |